US012717658B2

(12) United States Patent
Richey et al.

(10) Patent No.: US 12,717,658 B2
(45) Date of Patent: Aug. 25, 2026

(54) METHOD OF PROVIDING RESOURCES FOR AN EVENT

(71) Applicant: LENOVO (SINGAPORE) PTE. LTD, New Tech Park (SG)

(72) Inventors: Allen Richey, Frisco, TX (US); Inna Zolin, Cary, NC (US); Matthew Fardig, Boonville, IN (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 0 days.

(21) Appl. No.: 17/814,105

(22) Filed: Jul. 21, 2022

(65) Prior Publication Data

US 2024/0028425 A1 Jan. 25, 2024

(51) Int. Cl.
*G06F 9/54* (2006.01)
*H04W 4/021* (2018.01)

(52) U.S. Cl.
CPC .............. *G06F 9/542* (2013.01); *G06F 9/543* (2013.01); *H04W 4/021* (2013.01)

(58) Field of Classification Search
None
See application file for complete search history.

(56) References Cited

U.S. PATENT DOCUMENTS 10,270,784 B1* 4/2019 Narges .................. H04L 63/107
2012/0066302 A1* 3/2012 Petersen ............... H04L 67/535 709/204
2013/0339525 A1* 12/2013 Tamari ................ G06F 21/6218 709/225
2014/0019958 A1* 1/2014 Sherman ................... G06F 8/61 717/178
2014/0222907 A1* 8/2014 Seligmann ............ H04L 65/103 709/204
2015/0094093 A1* 4/2015 Pierce ................... H04W 4/021 455/456.3
2015/0120362 A1* 4/2015 Whorley, Jr. ...... G06Q 10/1093 705/7.19
2016/0012214 A1* 1/2016 Jones ...................... H04W 4/33 726/2
2016/0188309 A1* 6/2016 Bhat ......................... G06F 8/61 717/175
2016/0364819 A1* 12/2016 Salimi ................... H04W 4/021
2018/0293059 A1* 10/2018 Armand ..................... G06F 8/61
2019/0347186 A1* 11/2019 Dominick ........... G06F 11/3495
2019/0370081 A1* 12/2019 Suresh .................... G06F 21/53
(Continued)

*Primary Examiner* — Umut Onat
(74) *Attorney, Agent, or Firm* — Carroll, Hoette & Butscher, LLC; Josef L. Hoffmann

(57) ABSTRACT

A primary electronic device is provided that includes a processor, and a memory storing program instructions accessible by the processor. Responsive to execution of the program instructions, the processor performs the following, determining a resource associated with an event, and identifying an auxiliary electronic device within an environment of the event. The processor also performs communicating with the auxiliary electronic device to determine whether the auxiliary electronic device has the resource in response to identifying the electronic device within the environment, and notifying a user of the auxiliary electronic device or the primary electronic device that the auxiliary electronic device does not have the resource in response to determining the electronic device does not have the resource.

6 Claims, 4 Drawing Sheets

(56) References Cited

U.S. PATENT DOCUMENTS

| | | | | |
|---|---|---|---|---|
| 2022/0208016 | A1* | 6/2022 | Le Chevalier .......... | G06F 3/011 |
| 2023/0274412 | A1* | 8/2023 | Nadin Pinheiro ...... | G06T 7/001 382/103 |
| 2023/0318862 | A1* | 10/2023 | Bran ........................ | H04N 7/15 709/204 |

* cited by examiner

METHOD OF PROVIDING RESOURCES FOR AN EVENT

FIELD

The present disclosure relates generally to a method and system for ensuring electronic devices have resources required for an event.

BACKGROUND OF THE INVENTION

As electronic devices become more and more integrated into people's day to day lives, numerous resources have been created to enhance the use of electronic device. Resources include webpages, websites, applications (e.g. apps), or the like that can be provided or installed on an electronic device for use by a user of the electronic device. Such applications can include web conferencing applications, clock or timer applications, messaging applications, games, business based applications, learning based applications, or the like.

While all of these different resources can facilitate learning, communication, investing, business, personal health, etc. the number of applications has become overwhelming. For example, in a school environment, numerous learning applications exist that can be utilized by a professor, teacher, aide, etc. is learning a subject. However, not every professor, teacher, aide, etc. uses the same applications. While one teacher may utilize Brainly™, another may utilize Camtasia™.

Currently, a teacher can only provide what programs will be utilized before a class begins, and has to hope students install the correct application before a class has started. If a program is not installed, then the teacher has to spend time helping students install the application, and has to be hopeful that that installation does not take too long to load during active instructional time. Currently, there are no mechanism to help ensure that the application about to be pushed out already exists, much less anticipate a launch, and even optimize it.

Similarly, in other settings, such as business settings, certain customers or clients tend to have particular applications that they prefer using. So, when scheduling a conference call with a first client, the first client may prefer to Webex™, while when scheduling a conference call with a second client, the second client may prefer Zoom™. Often clients can become frustrated when using a system that is unfamiliar to them, or must waste time installing software to participate in the meeting.

Accordingly, a need remains for methods and devices to facilitate the use of resources such as applications to enhance utilization of the resources.

SUMMARY

In accordance with embodiments herein, a primary electronic device is provided that includes a processor, and a memory storing program instructions accessible by the processor. Responsive to execution of the program instructions, the processor performs the following, determining a resource associated with an event, and identifying an auxiliary electronic device within an environment of the event. The processor also performs communicating with the auxiliary electronic device to determine whether the auxiliary electronic device has the resource in response to identifying the electronic device within the environment, and notifying a user of the auxiliary electronic device or the primary electronic device that the auxiliary electronic device does not have the resource in response to determining the electronic device does not have the resource.

Optionally, the primary electronic device also includes at least one sensor configured to obtain context awareness information, and determining the resource associated with the event includes analyzing the context awareness information in real time. In one aspect, the one or more processors are configured to analyze the context awareness information with an artificial intelligence algorithm to determine the resource associated with the event. In another aspect, the one or more processors are further configured to automatically instruct the auxiliary electronic device to install the resource onto the auxiliary electronic device. In yet another aspect, the communication is one of a pop-up text box, electronic mail, or text message. In one example, the resource is one of an application, webpage, document, or presentation. In another example, identifying the auxiliary electronic device within the environment includes determining the electronic device is connected to a determined network. In one embodiment, the event is at least one of a class, presentation, or a conference. In another embodiment, notifying a user of the auxiliary electronic device or the primary electronic device that the auxiliary electronic device does not have the resource includes instructions regarding how to obtain the resource.

In accordance with embodiments herein, a method is provided where under control of one or more processors configured with executable instructions, the method includes determining a resource associated with an event. The method also includes identifying an electronic device within an environment of the event, communicating with the electronic device to determine whether the electronic device has the resource in response to identifying the electronic device within the environment, and providing a notification that the electronic device does not have the resource in response to determining the electronic device does not have the resource.

Optionally, the method also includes automatically obtaining the resource at the electronic device in response to determining the electronic device does not have the resource, and installing the resource onto the electronic device. In one aspect, providing a notification that the electronic device does not have the resource includes providing the notification to a user of the electronic device. In another aspect, determining the resource associated with the event includes obtaining context awareness data related to the event, and analyzing the context awareness data with an artificial intelligence algorithm to determine the resource. In one example, identifying the electronic device is within the environment includes forming a geofence around the environment, and detecting when the electronic device is within the geofence. In another example, identifying an electronic device within the environment includes determining the electronic device is connected to a determined network.

In accordance with embodiments herein, a computer program product is provided that includes a non-signal computer readable storage medium comprising computer executable code to determine a resource associated with an event. The computer program also has executable code to identify an auxiliary electronic device within an environment of the event, communicate with the auxiliary electronic device to determine whether the auxiliary electronic device has the resource in response to identifying the electronic device within the environment, and notify a user of the auxiliary electronic device or a primary electronic device that the auxiliary electronic device does not have the resource in response to determining the electronic device does not have the resource.

Optionally, the computer program also has executable code to obtain context awareness information, and analyze the context awareness information with an artificial intelligence algorithm to determine the resource associated with the event. In one aspect, the computer program also has executable code to automatically instruct the auxiliary electronic device to install the resource onto the auxiliary electronic device. In another aspect, the computer program also has executable code to identify the auxiliary electronic device within the environment by determining the electronic device is connected to a determined network. In one example, the computer program also has executable code to identify the auxiliary electronic device within the environment by determining the electronic device is within a geofence.

DETAILED DESCRIPTION

Figure 1:
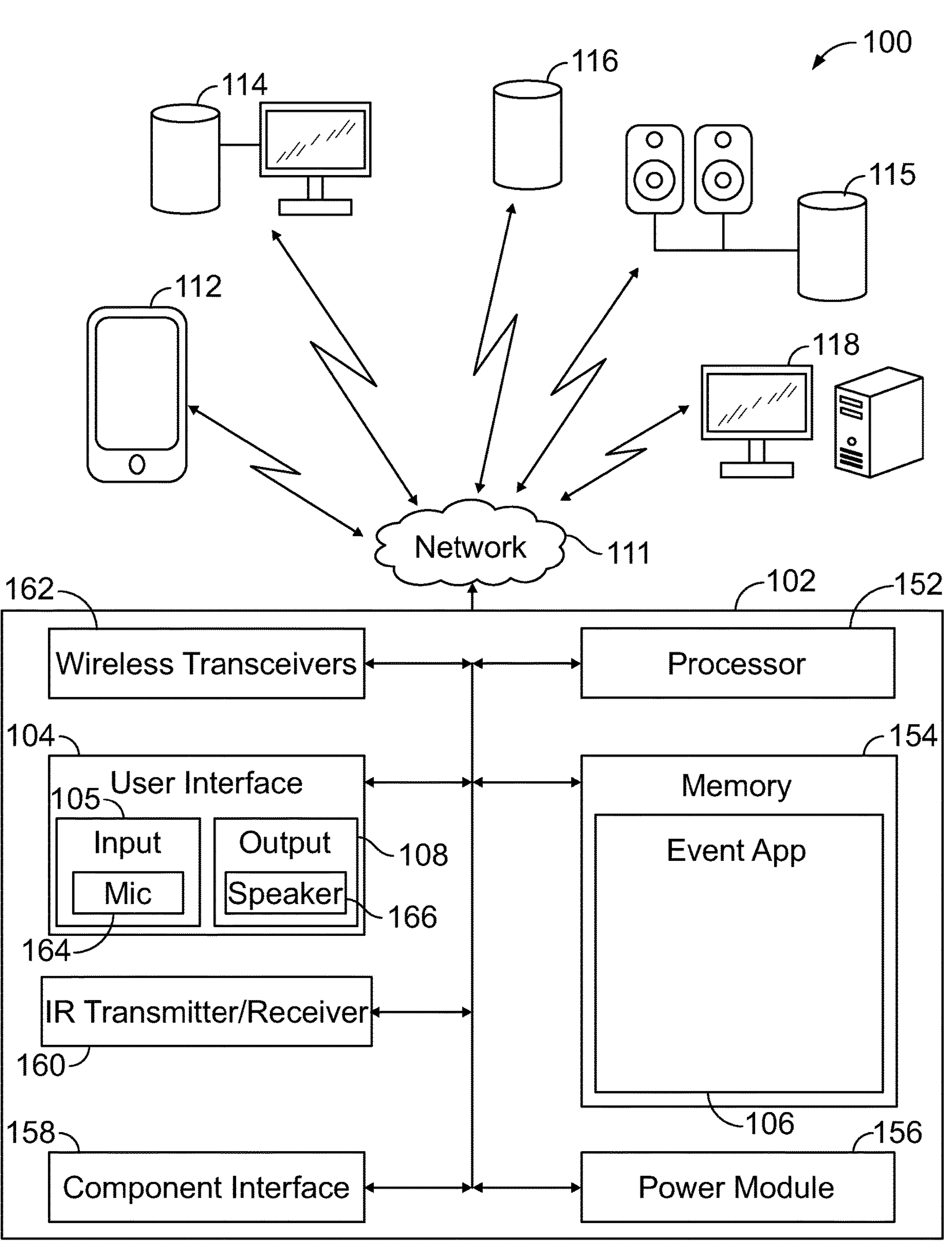
FIG. 1 illustrates schematic view of a system for preparing an auxiliary electronic device for an event based on context awareness information in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Terms

The term "context awareness information" refers to information indicative of a condition present in an environment in which one or more electronic devices are located. Non-limiting examples of context awareness information include an identity of a user of an electronic device within an environment, the setting or details related to the environment, terms utilized in a search inquiry, or the like.

The term "environment" refers to a physical region in which one or more electronic devices are located and in which actions performed by the electronic device are perceived (e.g., heard, seen, felt) by individuals. By way of example, an environment may refer to one or more rooms in a home, school, library, office, or other structure. An environment may or may not have physical boundaries. For example, an environment instead be defined based upon a range over which individuals may perceive actions by electronic devices. For example, an environment may refer to one or more of a pool area, a deck on a house, a backyard, an exterior area outside of an office building, a commercial area, school, and the like, where approximate virtual boundaries of the environment correspond to the range over which actions by electronic devices may be heard, seen, felt or otherwise perceived. When an electronic device is portable and/or handheld, an environment associated with the electronic device may shift over time when the electronic device is moved. For example, an environment surrounding a smart phone, tablet device or laptop computer moves with the smartphone, tablet device or laptop computer. An environment surrounding an electronic device will shift each time the electronic device is relocated, such as when moved between different rooms of a home, office building or other residential or commercial structure.

The term "event" as used herein refers to a planned occasion where a user of a primary electronic device provides data or information to a group of users that have auxiliary electronic devices. For example, the event may be a class where the teacher or professor is the user of the primary electronic device, and the students are the users of the auxiliary electronic devices. In another examples a boss, presenter, web-conference host, or the like may be a user of the primary electronic device while employees, attendees, or the like can be the users of the auxiliary electronic devices. The event includes a beginning and an end, and can occur in a physical environment or a virtual environment.

The term "resource" as used herein refers to any application, webpage, website, file, document, presentation, or the like that can be utilized by a user during an event. In one example a resource can be a learning application utilized to assist students during a class (e.g. an event). In another example, the resource can be a network resource such as a webpage or website that is found on the IoT, or utilizing a network that includes data and information that can be utilized during an event. In another example, the resource can be a local resource such as a file, document, etc. stored in a local storage device that is not in a network.

The term "real time" as used herein shall mean at the same time, or a time substantially contemporaneous, with an occurrence of another event or action. For the avoidance of doubt, as an example, when a search is requested by a user and relevant resources are provided in real-time in response to the search, the relevant resources are received by the user within a few seconds of the search.

The term "obtain" or "obtaining", as used herein in connection with data, information and the like, includes at least one of i) accessing memory of a local external device or resource manager where the data, signals, information, etc. are stored, ii) receiving the data, signals, information, etc. over a wireless communications link between the client device and a local external device, and/or iii) receiving the data, signals, information, etc. at a resource manager over a network connection. The obtaining operation, when from the perspective of a client device, may include sensing new signals in real time, and/or accessing memory to read stored data, signals, information, etc. from memory within the client device. The obtaining operation, when from the perspective of a local external device, includes receiving the data, signals, information, etc. at a transceiver of the local external device where the data, signals, information, etc. are transmitted from a client device and/or a resource manager. The obtaining operation may be from the perspective of a resource manager, such as when receiving the data, signals, information, etc. at a network interface from a local external device and/or directly from a client device. The resource manager may also obtain the data, signals, information, etc. from local memory and/or from other memory, such as within a cloud storage environment and/or from the memory of a workstation.

Overview

A method is provided for artificial intelligence and/or machine learning algorithms to determine resources that are required or needed for an event associated with electronic devices. The event can be a class, meeting, conference call, presentation, conference, or the like, while the electronic devices can include a primary electronic device of a user that is a teacher, presenter, boss, etc. and the auxiliary electronic devices have users who are students, attendees, employees, etc. Based on context awareness information, a determination is made regarding the resources, including applications, that are needed or required for the event. Based on the determination, the electronic device can provide a communication to the user (e.g. administrator) of the auxiliary electronic devices regarding the resource required. The administrator can be a device, class, related to an environment, or the like. The communication can include directions regarding how to find the resource, or install and application. In one embodiment, the primary electronic device can automatically provide instructions to cause the auxiliary electronic device to obtain the resource. By providing the communication regarding the resource required, installation of an application that is needed can begin immediately to minimize the time needed to obtain access to the resource during the event. In this manner, a user always has the necessary applications installed on their device and are ready to go on demand based on the context awareness information. Precious time can thus be saved by ensuring the resources, such as applications that are being leverage at an event, are installed and up to date when needed. The method also reduces the time spent attempting to hunt down and install files by suggesting ahead of time what applications are needed based on the context awareness information.

FIG. 1 illustrates a system 100 for providing resources for an event before an event occurs based on real time context awareness of a primary electronic device 102 in accordance with embodiments herein. The system 100 includes the primary electronic device 102 that is configured to obtain real time context awareness information related to both the user and the environment of the user, and then determine what resources, such as application are required for an event, before an event begins. The primary electronic device 102 in example embodiments can be a laptop computer, central processing unit (CPU), desktop computer, smartphone, smartwatch, Tablet, smart TV, or the like.

As shown in FIG. 1, the primary electronic device 102 includes components such as one or more processors 152 (e.g., a microprocessor, microcomputer, application-specific integrated circuit, etc.), one or more local storage medium (also referred to as a memory) 154, a user interface 104 which includes one or more input circuits 105 and one or more output circuits 108, a power module 156, a component interface 158, an infrared transmitter receiver 160 and one or more wireless transceivers 162. All of these components can be operatively coupled to one another, and can be in communication with one another, by way of one or more internal communication links, such as an internal bus.

The input circuit 105 in one example supports a microphone 164. The microphone 164 can obtain context awareness information such as audible noises, sounds, words, statement, or the like that can be analyzed to determine the context awareness information. In another example, the input circuit 105 is coupled with a document reader, content reader, or the like, that can analyze documents, webpages, agendas, or the like to determine context awareness information therefrom. Alternatively the input circuit 105 can support a keyboard, touch screen, touch pad, mouse, or the like. The input circuit 105 cooperates with an input device (e.g. microphone, keyboard, document, etc.), and receives context awareness information. For example, the input device can communicate with an event application 106 that can determine the user of the primary electronic device 102, user characteristics, environmental characteristics, audience characteristics, or the like. Audience characteristics can include identity, age, gender, accent, or the like. The processors 152 also execute program instructions stored in the memory 154 to interpret and perform actions from the event application to make determinations regarding the event, and resources applicable that are relevant to the event. In another example, the context awareness information may include a student login and profile, a voice identification from a microphone, an input from a student of their age, or grade, or the like.

The local storage medium 154 can store information related to an event application 106, and an event that is to occur. An event includes any class, meeting, conference, presentation, call, or the like where the primary electronic device is utilized. In one example, a primary electronic device is provided that includes the event application 106 that communicates with auxiliary electronic devices 112-116 regarding the event. To this end, in an example, the primary electronic device 102 can be in communication with numerous auxiliary electronic devices 112-116, such as each auxiliary electronic device within a classroom full of individual students with the individual auxiliary electronic devices. To this end, in one example, the event application 106 receives inputs from auxiliary electronic devices 112-116, via the cloud, through a network, etc. The auxiliary electronic devices 112-116 may include one or more sensors, keyboards, mouses, microphones, or the like that can obtain real time context awareness information about the user, environment of the user, or the like, and communicate the real time context awareness information to the primary electronic device 102.

In one example, the primary electronic device can include the event application 106, and can belong to a teacher and the auxiliary electronic devices 112-116 belong to students. In another example the primary electronic device 102 includes the event application 106 and belongs to a person hosting a conference call and the auxiliary electronic devices are used by persons participating in the conference call. In yet another example the primary electronic device includes the event application 106 and is used by a speaker at a conference, and the auxiliary electronic devices are used by an attendee of the conference. In each instance, the primary electronic device can obtain context awareness information related to the event, environment, etc. and communicate with the auxiliary electronic devices regarding resources, including application(s) that should be installed for the event. While in these examples the primary electronic device 102 includes the event application 106, in another embodiments, the auxiliary electronic device 112-116 (e.g. of the student, call participant, conference goer, etc.) includes an event application that obtains context awareness information. In such an embodiment, a pop-up text box on a display, text, email, of the auxiliary electronic device 112-116 may be provided to make the user of the auxiliary electronic device 112-116 aware of the resources, including applications to install, use, or the like for the event. In yet another example embodiment, both the primary electronic device 102 and the auxiliary electronic devices each have an event application, and can share context awareness information, resource information, etc. with one another.

The primary electronic device 102 also includes an output circuit 108 and the transceivers 162, one or both of which may output incoming and/or modified user instructions to the collection of responsive auxiliary electronic devices 112-116. The output circuit in one example supports a speaker 166. In other examples, the output circuit can support a display, screen, touchscreen, or the like. The transceiver 162 in one example also receives real time context awareness information from the auxiliary electronic devices 112-116. The primary electronic device 102 can also include the user interface 104 and is configured to access a network 111 over a wired or wireless connection. As non-limiting examples, the primary electronic device 102 may access the network 111 through a wireless communications channel and/or through a network connection (e.g., the Internet of Things (IoT)). Additionally or alternatively, the primary electronic device 102 may be a wired or wireless communication terminal, such as a desktop computer, laptop computer, network-ready television, set-top box, and the like.

The one or more auxiliary electronic devices 112-116 may represent the same type or different types of electronic devices as the primary electronic device 102, and/or a speaker, home theater system, computer, mobile phone, television, communication content player, smart watch, and the like. The primary electronic device 102 can communicate with one or more of the collection of one or more responsive auxiliary electronic devices 112-116 over the network 111, and/or over a separated wired or wireless link there between to obtain real time context awareness information. For example, the primary electronic device 102 may be a laptop computer that includes a camera that can obtain related context awareness information, and can also obtain Global Navigation System (GNS) location information from a smart phone of the user that is within the environment. In this manner, the auxiliary electronic devices 112-116 may communicate with the primary electronic device 102 of the user to provide context awareness information. To this end, in one example, geo-fencing can be utilized to determine the resources to be utilized by the auxiliary electronic devices 112-116.

For example, in a classroom setting, a teacher Mr. Smith may be known to utilize Brainly™ for teaching his class. Thus, an event application of Mr. Smith's primary electronic device 102 may automatically communicate with any auxiliary electronic devices 112-116 within the environment 117 (e.g. the classroom) that the Brainly™ application should be installed when the auxiliary electronic devices 112-116 enter Mr. Smith's classroom. Therefore, if a student does not have Brainly™ installed on their auxiliary electronic device 112-116 (e.g. their school tablet), they receive a message with instructions of how to install Brainly™ before the school bell rings to start class. Therefore, the student can immediately follow the directions for installing and begin the installation process while waiting for class to begin instead of when Mr. Smith begins using the Brainly™ application. In an alternative embodiment, the student's electronic device can also include an event application, and the event application can cause the one or more processors of the auxiliary electronic device 112-116 to automatically start installing the Brainly™ application upon entering the classroom, or upon receiving the communication. In yet another example, the primary electronic device 102 may communicate instructions to the auxiliary electronic device 112-116 that cause the auxiliary electronic device 112-116 to automatically install, download, open, etc. the resource on the auxiliary electronic device 112-116. In yet another alternative example, the event application provides a list of resources needed, and communicates the list to an auto provisioning system to push the resources to the client, saving time and reducing learning loss.

In order to determine the resource required for an event, the event application 106 can utilize artificial intelligence (AI), a machine learning (ML), and/or data analytics algorithm to make determinations related to the context awareness information. The event application can similarly determine whether to provide a communication, or automatically retrieve or instruct to install a resource. For example, the event application 106 can include program instructions to monitor the words of a teacher, and associate that when the teacher uses the term "math" that within an average of two minutes at least 80% of the auxiliary electronic devices open an application named Monster Math™. Once it is determined the other electronic devices are using the Monster Math™ application, the event application can determine a student who does not have the Monster Math™ application installed and provide a communication with instructions on how to install the application. In addition, based on an AI, ML, and/or data analytics algorithm, a determination can be made that after a teacher uses the term "math" for the first time during a day, that a threshold percentage of the time, such as thirty percent (30%) of the time at least 50% of students open Monster Math™. When this occurs, then when students in class in a following year come to class, the first time the teacher uses the word math, the communication is provided regarding installing Monster Math™, including instructions of how to install the Monster Math™ application. Therefore, instead of waiting the two minutes to determine other students are opening the Monster Math™ application, the event application 106 immediately sends the communication to speed up the starting of the installation process.

The primary electronic device 102 is configured to access the network resources 118, including web-based or network-based data, applications, webpages, and services, via the network 111. The network 111 may represent one or more of a local area network (LAN), a wide area network (WAN), an Intranet or other private network that may not be accessible by the general public, or a global network, such as the IoT or other publicly accessible network. The network 111 provides communication between the primary electronic device 102 and one or more network resources 118. It will be understood that, in some embodiments, the network resources 118 may represent a single entity or one or more physical or virtual servers that are configured to deliver online resources to the primary electronic device 102. Examples of the network resources 118 include, but are not limited to, web pages, websites, web-based or network-based data storage services, social networking applications, shopping services, payment services, multimedia content delivery services, financial services and the like. The resources 118 may represent a Web service or a network service for an e-commerce business, financial institution, or any other commercial, noncommercial, personal, nonprofit or other entity.

Figure 2:
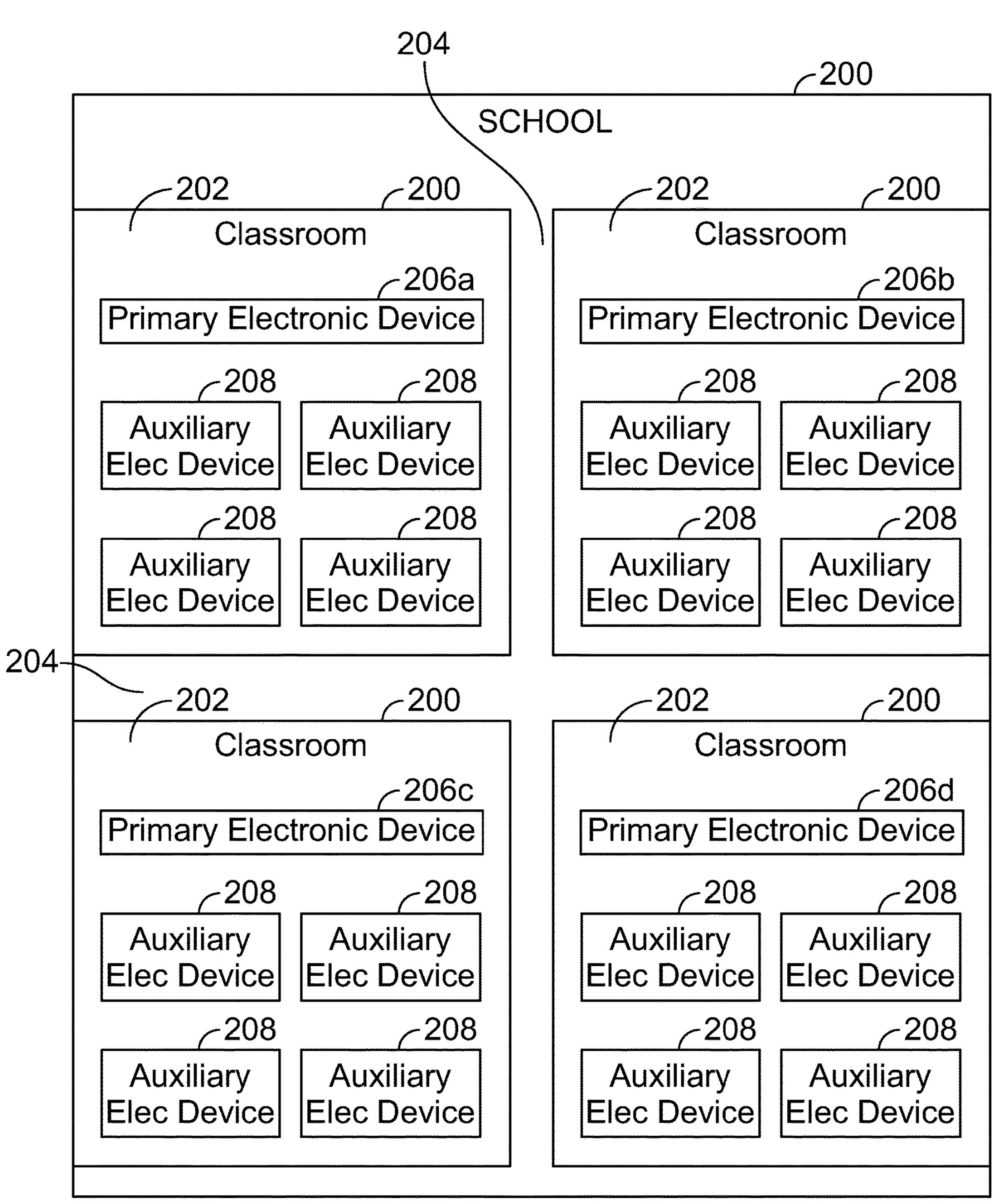
FIG. 2 illustrates a schematic view of an environment in which embodiments herein may be implemented.

FIG. 2 illustrates a top plan view of an environment in which embodiments herein may be implemented. The environment 200 may represent a home, office, classroom, or other structure. In the example of FIG. 2, the environment 200 represents a classroom with plural classes 202, hallways 204, and other regions such as bathrooms, offices, janitor closets, or the like. The primary electronic devices 102*a-e*, and auxiliary electronic devices 112-116 are shown at representative locations distributed throughout the environment 200. Embodiments herein consider real time context awareness information indicative of individuals that are within a proximal range of the primary electronic devices 102*a-e* and auxiliary electronic device 112-116, as well as the activities currently being undertaken by the individuals proximate to the electronic devices 102*a-e*, 112-116.

By obtaining real time context awareness information related to the environment and other potential individuals in the environment, an event application can make determinations regarding resources such as webpages, application, etc. that may be need for a determined teacher within a determined classroom. For example, the primary electronic devices 102*a-e* can each be used by a teacher. Each of the primary electronic devices 102*a-e* can include an event application that obtains context awareness information related to the teacher and the environment. For example, context awareness information can include the username, login information, setting information, or the like associated with the teacher. The context awareness information can also include the location of the primary electronic device within a classroom, along with information related to auxiliary electronic devices (e.g. 112-116) that are within the same environment 201. In this example, each individual class room represents an environment. In addition, the school itself represents an environment 201 that includes the individual environments 201 of the classrooms. Additional context awareness information can include agendas, syllabuses, calendars, schedules, or the like saved on the primary electronic device 102*a-e* of a teacher. In particular, the event application can include text reading software configured to analyze text of documents, calendars, etc. and determine meaning of the text. In another example, the context awareness information includes information input into the event application by a teacher. Thus, a teacher may use the event application and provide a syllabus, agenda, the name of an application desired to be used, or the like to inform the event application of context awareness information.

Once an event application determines from the context awareness information a resource desired to be utilized by the teacher by the auxiliary electronic devices 112-116 in the environment of the classroom, the event application includes instructions to communicate with the auxiliary electronic devices 112-116 in the environment regarding the resource(s). In one example, the event application includes an AI, ML, and/or data analytics algorithm that analyzes the context awareness information to determine the resource(s) needed in real-time. For example, the determination can be made based on a word, phrase, etc. utilized by the teacher, a time of day being reached, a question asked by a student, a time on a calendar being reached, or the like. In each instance, the AI, ML, and/or data analytics algorithm attempts to determine a pattern associated with the use of a resource. To this end, the primary electronic device 102*a-e* and auxiliary electronic devices 112-116 can be in communication with one another so that the event application can determine when a resource, such as an application, is launched and used by either the primary electronic device 102*a-e* and/or the auxiliary electronic devices 112-116. First, the launching and use of such resources is context awareness information that can be utilized to inform auxiliary electronic devices 112-116 in an environment to install or use such a resource. Second the launching and use of such resources can result in the event application analyzing context awareness information obtained by the primary electronic device 102*a-e* or other electronic devices during a determined period prior to use of the resource. In one example, the determined period is one minute, in other examples the determined period is two minutes, five minutes, ten minutes, fifteen minutes, an hour, etc. In other examples, the determined period can be a longer time such as one hour, with the analysis providing greater weight to context awareness information occurring closer to the launching or use of the resource.

Once the AI, ML, or data analytics algorithm is utilized to determine patterns related to context awareness information resulting in the launch or use of a resource by the primary electronic device 102*a-e* or auxiliary electronic devices 112-116, when a similar pattern occurs in the future, the communication regarding the resource may be provided where such a communication was not provided in an original instance. In this manner, the AI, ML, or data analytics algorithm determines the patterns associated with the teach and the resource utilized, and primary electronic device 102 communicates with the auxiliary electronic devices 112-116 as soon as possible to install, utilize, etc. the resource. This reduces delays associated with the student obtaining the resource, interruptions to class time, etc. that would occur if the event application where not utilized.

While in the school example of FIG. 2 the primary electronic devices 102*a-e* include the event application, in other examples, the auxiliary electronic devices 112-116 include the event application. Similarly, both the primary electronic devices 102*a-e* and auxiliary electronic devices 112-116 can include an event application and communicate with one another accordingly. As a result, in a school environment, numerous auxiliary electronic devices 112-116 can be provided to students at the beginning of a school year, or as a result of needing to replace or repair electronic devices, and an event application automatically in real-time communicates with each auxiliary electronic device 112-116 the resources needed as they enter a determined environment without additional inputs from a teacher, IT person, or the like. As such, significant time, frustration, etc. is saved, enhancing the learning experience. In addition, while described in relation to a school environment, the event application can be utilized in a similar manner in other environments as well, including office environments, public environments, conference environments, or the like.

Figure 3:
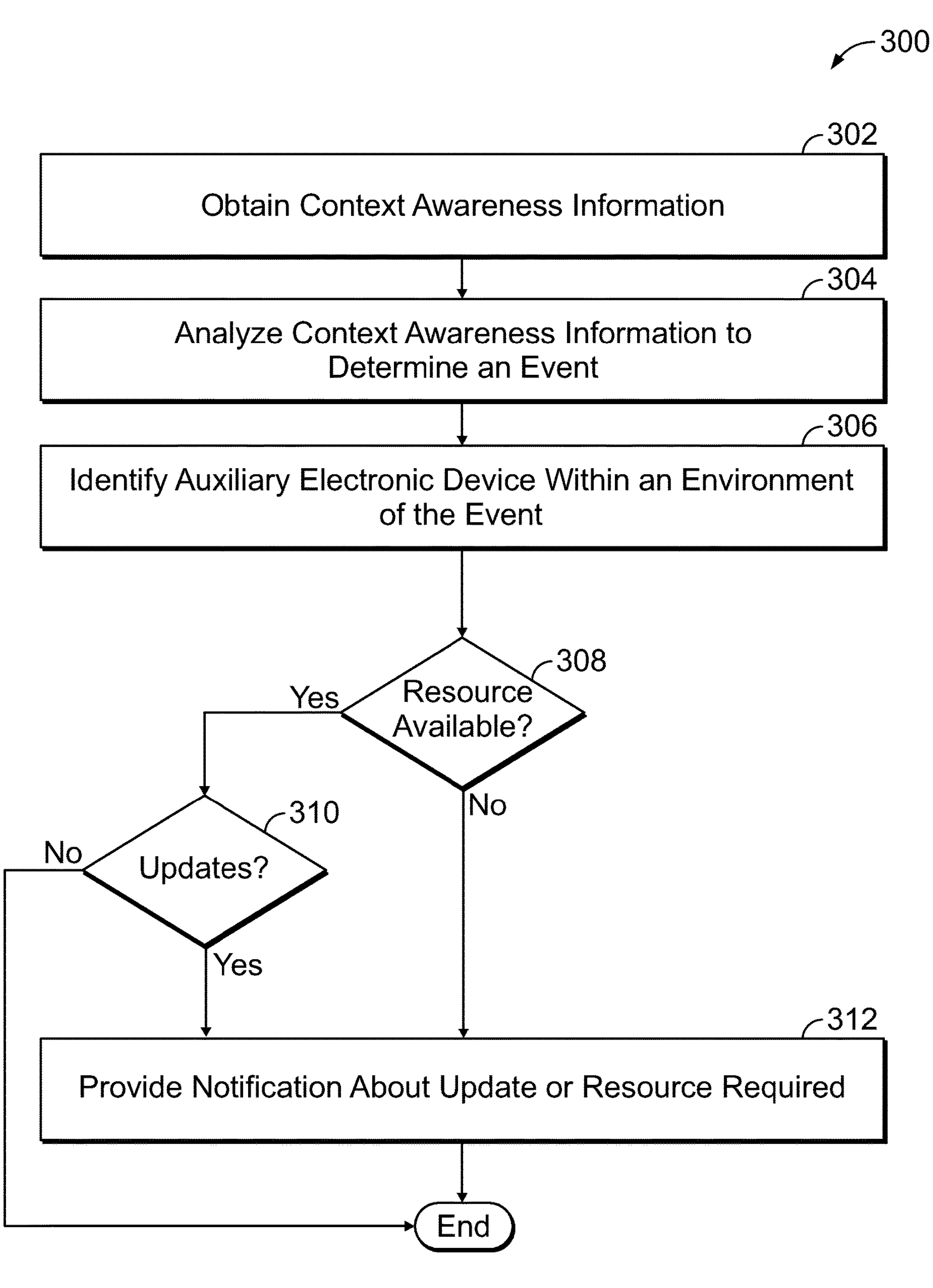
FIG. 3 illustrates a block flow logic diagram of an electronic device utilized to notify a user of an auxiliary electronic device of a resource need for an event, in accordance with embodiments herein.

FIG. 3 illustrates a method 300 for ensuring that auxiliary electronic devices include resources for an event. The method can be performed by any of the electronic devices, systems, etc. described in relation to FIGS. 1-2. In one example, a teacher has a primary electronic device and is teaching a class that is the event. The class (e.g. event) takes place in an environment that is a classroom, where students within the classroom have auxiliary electronic devices. Alternatively, the event is a presentation that is give at a conference in an environment of a conference room. In such an example, the presenter, or event coordinator may have the primary electronic device, where the electronic devices of attendees within the conference room (e.g. environment) have the auxiliary electronic devices. In yet another example, in a conference call is occurring where the host of the conference call can have the primary electronic device, and attendees have auxiliary electronic devices. In this example the event can be the conference call, while the environment is the network through which the primary electronic device and auxiliary electronic devices connect.

At 302, the one or more processors obtain context awareness information. The context awareness information can be obtained from a memory or storage device, and include previous presentations, lessons, files, etc. utilized by the primary electronic device. The context awareness information can also include information from sensors, including location data, camera data of the user, or of the environment, microphone data, etc. In another example, the context awareness information can be obtained from auxiliary electronic devices within the environment through communication with the primary electronic device. Such context awareness information can include the identification of the user of the auxiliary electronic device, resources on the auxiliary electronic device, sensor information captured by the auxiliary electronic device, or the like. In one such example, the context awareness information is that thirty auxiliary electronic devices are within an environment, and twenty-eight of the auxiliary electronic devices have a resource in use. In other examples, the context awareness information can include event characteristics such as the time of the event, number of individuals within an environment, or the like. In yet another example, context awareness information can be information inputted by a user of a primary electronic device, or an auxiliary electronic device. Either the Primary electronic device, or auxiliary electronic device can include a computer program product that wherein user information can be input into the computer program product. The information can include a class schedule, class subject matter, agenda, schedule, etc. where a known resource is associated with the information inputted. In each instance, the context awareness information provides context to whether a determined resource is being, or is to be utilized by auxiliary electronic devices within the environment.

At 304, the one or more processors analyze the context awareness information to determine a resource associated with an event. To analyze the context awareness information the one or more processors can utilize a lookup table, decision tree, mathematical model, mathematical function, AI algorithm, ML algorithm, analytics auditing algorithm, or the like. The resource in example embodiments can be an application, including network applications provided a web-based store, and can include game application, web-conferencing applications, learning-based applications, social networking applications, business applications, mobile applications, exercise applications, or the like. Example applications can include Brainly™, Duolingo™, Quizlet™, Kahoot™, Google Classroom™, BrainPop™, Camtasia™, etc. Alternatively, the resource can be a program, webpage, website, file, document, or the like. Meanwhile, the event can include any occurrence, class, conference call, conference, presentation, or the like that includes a group of individuals within an environment.

At 306, the one or more processors identify an auxiliary electronic device within an environment of the event. Once the event is determined, an environment associated with the event is formed. In one example, geofencing can be utilized to provide a boundary for a classroom, conference room, building, office space, or the like such that any electronic device within the geofence is within the environment of the event. In this manner, any auxiliary electronic device within the geofence is identified as within the environment. In other examples, the environment is formed based on electronic device accessing a network, access point, etc. So, if a conference room has its own network so that meeting with individuals outside a company is desired without those individuals accessing a company network, the environment includes the area of the network coverage. In this manner, anyone that logs onto or accesses the network is identified as within the environment. In yet another example, the environment is determined by electronic devices that are connected to a network, application, or the like. As an example, when the event that is occurring is a web-conference, every auxiliary electronic device connected to the web-conference is identified as within the environment of the event. To this end, the environment can be a physical environment, or a virtual environment.

At 308, the one or more processors communicate with an auxiliary electronic device identified to determine whether the auxiliary electronic device has the resource in response to identifying the electronic device is within the environment. In particular, a check is provided for each auxiliary electronic device identified within the environment to confirm that the auxiliary electronic device has the resource needed for the event in response to the auxiliary electronic device being identified. In this manner, remedial action can be immediately undertaken that will allow the user of the auxiliary device to obtain the resource prior to, or as soon as possible during the event.

If at 310, the one or more processors determine an auxiliary electronic device has a resource, at 312, a determination can be made whether any updates exist for the resource. If not, the one or more processors take not further action. However, if an update, or if there is a more recent version of the resource, then at 314, a notification is provided to either the user of the primary electronic device, the user of the auxiliary electronic device, or both that an updated or newer version of the resource is available. The notification can be a popup text box the appears on the display of an electronic device, an electronic message (e.g. email), text message, or the like. In one example, when a popup text box is provided, a link, instructions, webpage or webstore with the update or version, or the like is provided to obtain the resource. In this manner, the user receiving the notification can immediately begin updating, installing, downloading, accessing, etc. the updated, or newer version without additional steps.

If at 310 the auxiliary electronic device does not include a resource, a notification is provided that the electronic device does not have the resource. In this manner, the user is immediately made aware they do not have the resource needed. In one example, the notification includes instructions regarding how to obtain the resource. As used herein instructions do not have to include words or terms explaining steps of how to obtain the resource, but can also include a link that can be opened, a website address provided, or the like that can be utilized to obtain the resource. In one example, the resource is an application that can be installed on the auxiliary electronic device.

Figure 4:
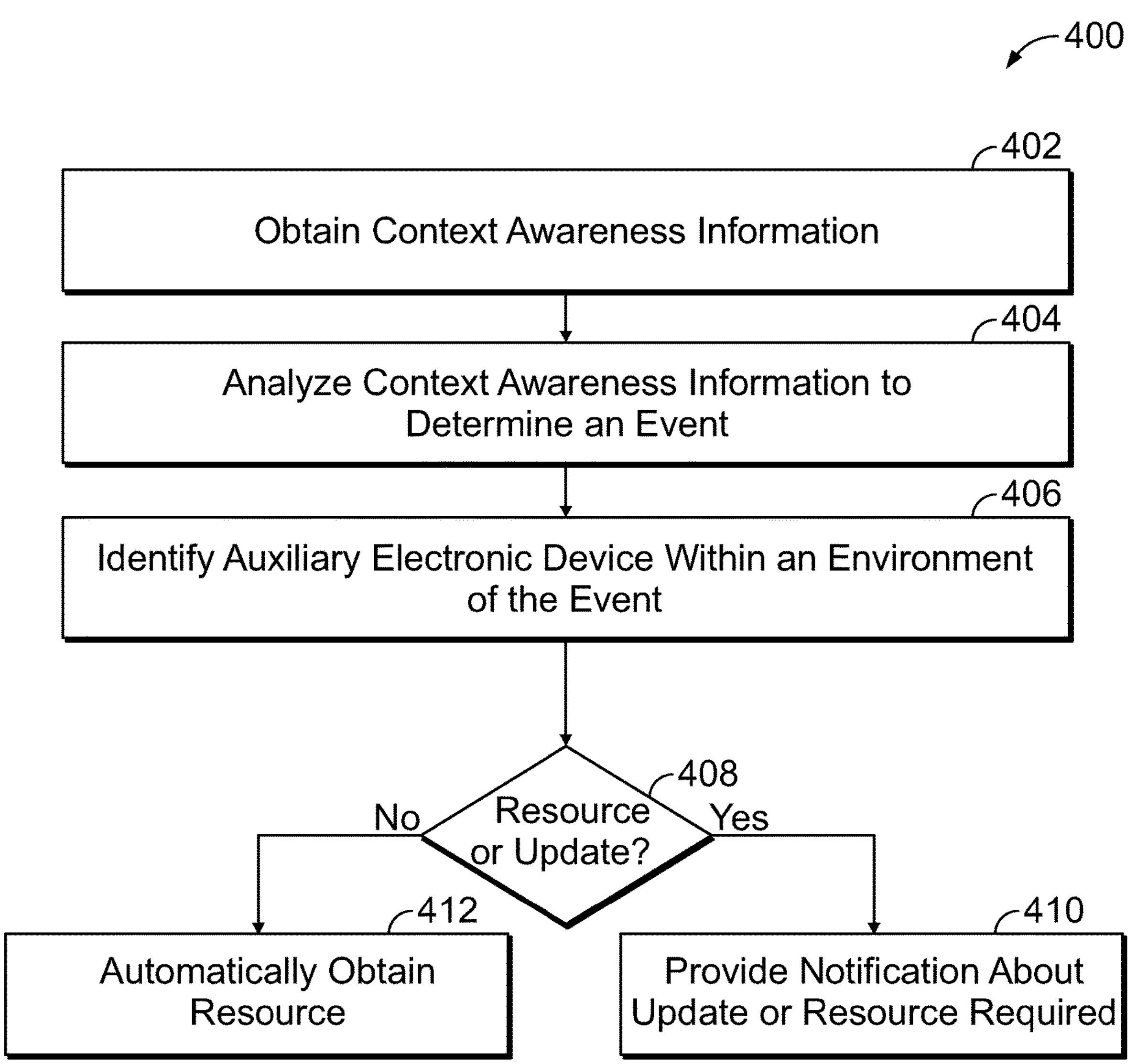
FIG. 4 illustrates a process for obtaining a resource for an auxiliary electronic device, in accordance with embodiments herein.

FIG. 4 illustrates a method 400 for installing a resource on an electronic device for an event. The method can be performed by any of the electronic devices, systems, etc. described in relation to FIGS. 1-2. In addition, the method can be performed in any of the example events and environments as discussed in relation to the method of FIG. 3.

At 402, the one or more processors obtain context awareness information. The context awareness information can be obtained from a memory or storage device, sensors of a primary electronic device, sensors or an auxiliary electronic device and communicated to the primary electronic device, inputted into the primary electronic device and/or auxiliary electronic device, communicated to the primary electronic device, or the like. Similar to the method of FIG. 3, the context awareness information includes any information that can be utilized to determine a resource for an event, an environment of an event, the event that is occurring, etc.

At 404, the one or more processors analyze the context awareness information to determine a resource associated with an event. To analyze the context awareness information the one or more processors can utilize a lookup table, decision tree, mathematical model, mathematical function, AI algorithm, ML algorithm, analytics auditing algorithm, or the like. In response to determining a resource is required for the event, at 406 the one or more processors identify auxiliary electronic devices within an environment of the event.

At 408, the one or more processors communicate with an auxiliary electronic device identified to determine whether the auxiliary electronic device has the resource, or needs to update a resource in response to identifying the electronic device is within the environment. If the auxiliary electronic device has the most up to date version of a resource, then no further action is required, and at 410, a notification is provided to the primary electronic device that auxiliary electronic device identified has the required resource. In this manner, the user of the primary electronic device knows that the auxiliary electronic device has been appropriately identified as within the environment, and that the user of the auxiliary device has the resource needed for the event.

If at 408, the auxiliary electronic device does not include the most up to date version of the resource, then at 412, the primary electronic device instructs the auxiliary electronic device to automatically obtain the most up to date version of the resource. In one example, the instructions result in one or more processors of the auxiliary electronic device to automatically install, or download an application. Alternatively, a file, presentation, etc. can automatically be opened, launched, or the like. In particular, in certain environment, such as in a school environment when the primary electronic device (e.g. the electronic device of the teacher), and all of the auxiliary electronic devices (e.g. the electronic devices of the students) in the environment are owned and/or provided by the same entity, permissions may be provided to allow the primary electronic device to automatically instruct the auxiliary electronic device to install the required resources for a class. In this manner, the school can just provide auxiliary electronic devices to each student, including replacement auxiliary electronic devices as needed, and each auxiliary will automatically install resources required for classes with the need for the student to do it themselves, interaction with parents, or otherwise. Instead, each auxiliary electronic device just automatically communicates with a primary electronic device based on, or within an environment to provide such resources. In addition, if a resource is unused for a determined period of time, such as one month, two months, etc., the resource may be automatically uninstalled. In this manner, a student can keep the same auxiliary electronic device year in, and year out, and not have memory space taken with resources from previous classes. Thus, by providing the methodology, time, energy, frustrations, etc. are saved in ensuring that a user of an auxiliary electronic device has the needed resources that a user of a primary electronic device desire the user of the auxiliary electronic device to have for an event.

CLOSING STATEMENTS

Before concluding, it is to be understood that although e.g., a software application for undertaking embodiments herein may be vended with a device such as the system 100, embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A system comprising:

a primary electronic device, comprising:

a processor;

a memory storing program instructions accessible by the processor, wherein, responsive to execution of the program instructions, the processor performs the following:

obtaining from the memory or from a sensor context awareness information related to a class where a user of the primary electronic device provides data or information to a group of users that have auxiliary electronic devices;

in response to obtaining the context awareness information, determining, with the processor, a learning-based application associated with the class in real time based on the context awareness information;

identifying, with the processor, an auxiliary electronic device of the auxiliary electronic devices within a classroom having physical boundaries of the class;

wherein the auxiliary electronic devices identified represent a subset of auxiliary electronic devices within a physical environment that encompasses the classroom;

communicating with the auxiliary electronic device via a transceiver to determine whether the auxiliary electronic device has the learning-based application associated with the class in response to identifying the auxiliary electronic device within the classroom;

notifying a user of the auxiliary electronic device or the primary electronic device with a communication that the auxiliary electronic device does not have the learning-based application in response to determining that the auxiliary electronic device does not have the learning-based application; and automatically instructing the auxiliary electronic device to install the learning-based application onto the auxiliary electronic device in response to determining the auxiliary electronic device does not have the learning-based application; and the auxiliary electronic device comprising:

an auxiliary processor;

an auxiliary memory storing program instructions accessible by the auxiliary processor, wherein, responsive to execution of the program instructions, the auxiliary processor performs the following:

installing the learning-based application onto the auxiliary electronic device in response to receiving instruction from the primary electronic device.

2. The system of claim 1, wherein determining the learning-based application associated with the class includes analyzing the context awareness information in real time.

3. The system of claim 2, wherein the processor is configured to analyze the context awareness information with an artificial intelligence algorithm to determine the learning-based application associated with the class; wherein analyzing the context awareness information with the artificial intelligence algorithm includes determining a pattern associated with the auxiliary electronic device.

4. The system of claim 1, wherein the communication is one of a pop-up text box, electronic mail, or text message.

5. The system of claim 1, wherein identifying the auxiliary electronic device within the classroom includes determining the electronic device is connected to a determined network.

6. The system of claim 1, wherein notifying the user of the auxiliary electronic device or the primary electronic device that the auxiliary electronic device does not have the learning-based application includes instructions regarding how to obtain the learning-based application.

* * * * *